(12) United States Patent
Henry

(10) Patent No.: US 9,674,526 B2
(45) Date of Patent: Jun. 6, 2017

(54) METHOD AND DEVICE FOR ENCODING AND DECODING A DIGITAL IMAGE SIGNAL

(75) Inventor: Félix Henry, St Gregoire (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 808 days.

(21) Appl. No.: 13/824,295

(22) PCT Filed: Sep. 20, 2010

(86) PCT No.: PCT/EP2010/063817
§ 371 (c)(1),
(2), (4) Date: Aug. 23, 2013

(87) PCT Pub. No.: WO2012/037963
PCT Pub. Date: Mar. 29, 2012

(65) Prior Publication Data
US 2013/0322529 A1     Dec. 5, 2013

(51) Int. Cl.
*H04N 7/12*      (2006.01)
*H04N 19/50*     (2014.01)
(Continued)

(52) U.S. Cl.
CPC ..... *H04N 19/00569* (2013.01); *H04N 19/105* (2014.11); *H04N 19/117* (2014.11);
(Continued)

(58) Field of Classification Search
CPC ...... G06T 9/005; H04N 19/61; H04N 19/577; H04N 19/587; H04N 19/59
(Continued)

(56) References Cited

U.S. PATENT DOCUMENTS 6,175,650 B1 *   1/2001   Sindhu ............... G06T 9/005
                                                     358/453
6,804,294 B1 * 10/2004   Hartung ............. H04N 19/52
                                                     375/240

(Continued)

FOREIGN PATENT DOCUMENTS

CA       2714691 A1    9/2009
FR       2927744 A1    8/2009
(Continued)

*Primary Examiner* — Jamie Atala
*Assistant Examiner* — Masum Billah
(74) *Attorney, Agent, or Firm* — Canon U.S.A., Inc. IP Division

(57) ABSTRACT

A method for encoding and decoding a digital image signal, and associated devices. A method for encoding a digital image signal represented by a set of digital samples includes applying a segmentor to a reference digital image signal to obtain subsets of digital samples and applying a same filter among a set of predetermined filters to each sample of a subset of digital samples. The method includes a step of selecting (S320) a subset of segmentors from a predetermined set of segmentors based upon at least one characteristic obtained from the reference digital image signal, and a step (S330) of determining one segmentor among the selected subset of segmentors to apply to the reference digital image signal. Advantageously, a large initial set of segmentors can be used, the selection of a subset allowing to limit the computational complexity and adapt the segmentor to the reference digital image to be filtered.

17 Claims, 9 Drawing Sheets

(51) Int. Cl.

| | |
|---|---|
| *H04N 19/105* | (2014.01) |
| *H04N 19/176* | (2014.01) |
| *H04N 19/147* | (2014.01) |
| *H04N 19/46* | (2014.01) |
| *H04N 19/51* | (2014.01) |
| *H04N 19/61* | (2014.01) |
| *H04N 19/593* | (2014.01) |
| *H04N 19/117* | (2014.01) |
| *H04N 19/14* | (2014.01) |
| *H04N 19/157* | (2014.01) |
| *H04N 19/192* | (2014.01) |
| *H04N 19/82* | (2014.01) |

(52) U.S. Cl.
CPC ........... *H04N 19/14* (2014.11); *H04N 19/147* (2014.11); *H04N 19/157* (2014.11); *H04N 19/176* (2014.11); *H04N 19/192* (2014.11); *H04N 19/46* (2014.11); *H04N 19/50* (2014.11); *H04N 19/51* (2014.11); *H04N 19/593* (2014.11); *H04N 19/61* (2014.11); *H04N 19/82* (2014.11)

(58) Field of Classification Search
USPC .................................................. 375/240.01
See application file for complete search history.

(56) References Cited

U.S. PATENT DOCUMENTS

2009/0210469 A1* 8/2009 Henry ................. H04N 19/176
708/308
2010/0118978 A1* 5/2010 Rodriguez ....... H04N 19/00927
375/240.26

FOREIGN PATENT DOCUMENTS

FR 2927745 A1 8/2009
WO WO2008/075247 A1 6/2008

* cited by examiner

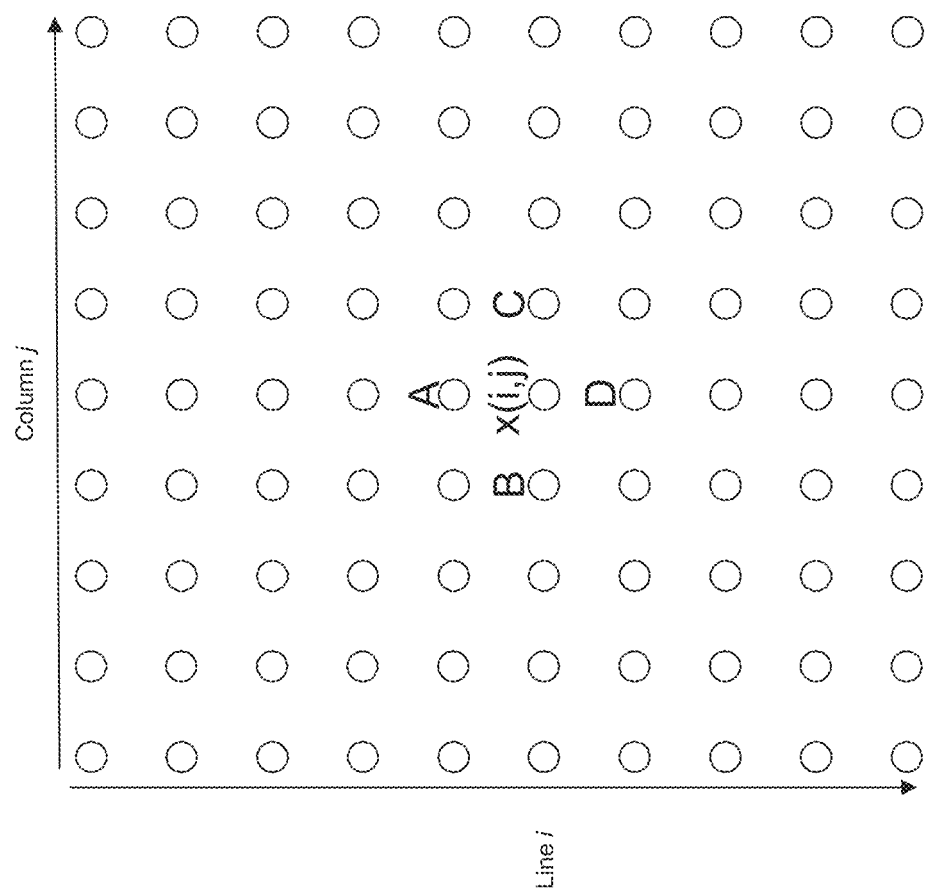

METHOD AND DEVICE FOR ENCODING AND DECODING A DIGITAL IMAGE SIGNAL

CROSS REFERENCE TO RELATED APPLICATIONS

This application is a National Stage filing of International Application No. PCT/EP2010/063817 filed Sep. 20, 2010, the disclosure of which is hereby incorporated by reference herein in its entirety.

FIELD OF THE INVENTION

The invention relates to a method and device for encoding a digital image signal and a method and device for decoding a compressed bitstream.

The invention belongs to the field of digital signal processing. A digital signal, such as for example a digital video signal, is generally captured by a capturing device, such as a digital camcorder, having a high quality sensor. Given the capacities of modern capture devices, an original digital signal is likely to have a very high resolution, and, consequently, a very high bitrate. Such a high resolution, high bitrate signal is too large for convenient transmission over a network and/or convenient storage.

DESCRIPTION OF THE PRIOR-ART

In order to solve this problem, it is known in the prior art to compress an original digital image signal into a compressed bitstream.

In particular, several video compression formats are known. Most video compression formats, for example H.263, H.264, MPEG1, MPEG2, MPEG4, SVC, referred to collectively as MPEG-type formats, use block-based discrete cosine transform (DCT) and motion compensation to remove spatial and temporal redundancies. They can be referred to as predictive video formats. Each frame or image of the video signal is divided into slices which are encoded and can be decoded independently. A slice is typically a rectangular portion of the image, or more generally, a portion of an image. Further, each slice is divided into macroblocks (MBs), and each macroblock is further divided into blocks, typically blocks of 8×8 pixels. The encoded frames are of two types: predicted frames (either predicted from one reference frame called P-frames or predicted from two reference frames called B-frames) and non predicted frames (called Intra frames or I-frames).

For predicted frames, motion estimation is applied to each block of the considered predicted frame with respect to one (for P-frames) or several (for B-frames) reference frames, and one or several reference blocks are selected. The difference block between the block and its reference block pointed to by the motion vector is calculated. The difference block is called a residual block or residual data. A DCT is then applied to each residual block, and then, quantization is applied to the transformed residual data, followed by an entropy encoding.

To encode an Intra frame, the image is divided into blocks of pixels, a DCT can be applied on each block, followed by quantization and the quantized DCT coefficients are encoded using an entropy encoder.

However, in H.264, Intra encoded blocks can be predicted from surrounding pixel values using one of the predefined Intra prediction modes. In this case, the difference between the predicted block and the original block is also called the residual block, and it is encoded by applying a DCT, followed by quantization and the quantized DCT coefficients are encoded using an entropy encoder.

In general terms, a given block of pixels of a current frame can be encoded by encoding the difference between the block and a reference block or predictor block, such an encoding being referred to as encoding by reference to a reference block.

There is a need for improving the video compression by providing a better distortion-rate compromise for compressed bitstreams, either a better quality at a given bitrate or a lower bitrate for a given quality.

A possible way of improving a video compression algorithm is improving the predictive encoding, aiming at ensuring that a reference block is close to the block to be predicted. Indeed, if the reference block is close to the block to be predicted, the coding cost of the residual is diminished.

A possible way of improving predictive encoding consists in applying a filtering to encode a block of the original signal.

It is known from the patent application FR2927744 to improve digital signal filtering by using so-called context functions to segment an input signal, such as a block of a digital image, into areas, and by determining a filter among a set of filters to apply to each segmented area. The context function is chosen among a predetermined set of context functions, by minimization of a coding cost criterion. Several possible context functions may be used to characterize local variations of a digital signal, and it is desirable to further improve the adaptation of context functions to the signal being processed.

U.S. Pat. No. 6,175,650 describes several segmentation methods to classify blocks into flat or busy blocks, and a JPEG quantization parameter is adapted accordingly. This classification is meant to characterize local variations of the signal, but it does not finely adapt to the local characteristics of the signal.

SUMMARY OF THE INVENTION

It is desirable to address one or more of the prior art drawbacks. To that end, the invention relates to a method for encoding a digital image signal represented by a set of digital samples, at least part of the digital image signal being encoded by reference to a reference digital image signal. The encoding method comprises applying a segmentor to said reference digital image signal to obtain subsets of digital samples and applying a same filter among a set of predetermined filters to each sample of a said subset of digital samples.

The encoding method comprises the following steps:
  selecting a subset of segmentors from a predetermined set of segmentors based upon at least one characteristic obtained from said reference digital image signal, and
  determining one segmentor among said selected subset of segmentors to apply to said reference digital image signal.

Thus, the invention provides the possibility of finely adapting the segmentors to the local characteristics of the reference digital image signal, while keeping a low complexity since the determination of the final segmentor is carried out within a subset of segmentors only. Further, the subset of segmentors may be selected so as to ensure that they produce diverse segmentations.

According to a particular feature, the method further comprises a step of encoding an item of information representative of said segmentor determined.

Advantageously, the decoder can therefore easily retrieve the segmentor for applying a filtering on the reference digital image signal.

Further, said item of information is chosen according to said selected subset of segmentors.

According to an embodiment, said item of information comprises an index of said segmentor, said index being encoded taking into account the number of segmentors of said selected subset of segmentors.

Advantageously, the item of information representative of the segmentor determined can be efficiently coded as an item if the selected subset of segmentors.

According to an embodiment, said reference digital image signal is a block of samples of a digital image, and said characteristic is representative of a predictive encoding mode applied to encode said block of samples, and in the selecting step, a predetermined subset of segmentors is selected based upon said characteristic. Therefore, the characteristic of the reference digital image signal is easily retrieved.

According to an embodiment, said predictive encoding mode an Intra-prediction mode of H.264 encoding format. In particular, H.264 defines 9 Intra-prediction modes, the modes being related to directions of prediction of the sample values of a block with respect to values of neighbouring blocks.

According to another embodiment, the selecting step comprises, for each segmentor of said predetermined set of segmentors, taken in a predetermined order:

applying said segmentor on said reference digital image signal, each digital sample of the reference digital image signal being associated with a segmentation value representative of a segmented subset of digital samples and adding said segmentor to said subset of segmentors if said segmentation values obtained satisfy at least one predetermined matching criterion.

Advantageously, this embodiment can be applied to any reference digital image signal.

In particular, the predetermined matching criterion comprises checking whether at least two different segmentation values have been obtained by applying said segmentor. Therefore, the predetermined matching criterion prevents including in the selected subset two or more segmentors that produce similar segmentations for the part of the digital image signal being encoded.

According to an embodiment, the predetermined matching criterion comprises checking whether there is no previously applied segmentor which provides the same segmentation values on a predetermined quantity of digital samples of said reference digital image signal.

Advantageously, these features ensure that the selected segmentors actually provide a variety of segmentations of the reference digital image signal.

According to a particular embodiment, a segmentor is a context function, a context function being a function that, when applied to a given digital sample of a set of digital samples, takes into account a predetermined number of other digital samples of said set of digital samples and outputs a context value.

The computation of the values of such context functions is simple, and therefore the calculation complexity is low.

According to an embodiment, a segmentor is obtained by:
applying an edge detector operator on said reference digital image signal providing a value representative of an estimation of a local edge orientation associated with each digital sample of said reference digital image signal, and applying an orientation segmentation function which takes into account said value representative of an estimation of a local edge orientation and outputs a value among a predetermined set of possible values.

Advantageously, the edge detection allows taking into account the edges present in the reference digital image signal to more adapt the filtering and therefore to improve the encoding performances.

According to a second aspect, the invention relates to a device for encoding a video signal for encoding a digital image signal represented by a set of digital samples, at least part of the digital image signal being encoded by reference to a reference digital image signal. The device comprises means for applying a segmentor to said reference digital image signal to obtain subsets of digital samples and means for applying a same filter among a set of predetermined filters to each sample of a said subset of digital samples. The device comprises:

means for selecting a subset of segmentors from a predetermined set of segmentors based upon at least one characteristic obtained from said reference digital image signal, and means for determining one segmentor among said subset of selected segmentors to apply to said reference digital image signal.

According to a third aspect, the invention concerns a method for decoding a bitstream comprising an encoded digital image signal represented by a set of digital samples, at least part of the digital image signal being encoded by reference to a reference digital image signal, the method comprising applying a segmentor to said reference digital image signal to obtain subsets of digital samples and applying a same filter among a set of predetermined filters to each sample of a said subset of digital samples. The decoding method comprises the following steps:

selecting a subset of segmentors of a predetermined set of segmentors based upon at least one characteristic obtained from said reference digital image signal, and obtaining from said bitstream an item of information representative of a segmentor among said selected subset of segmentors to apply to said reference digital image signal.

Advantageously, the filtering of the reference digital image signal is adapted to the local characteristics of the digital image signal, and a segmentor may be chosen among a large set of segmentors. The item of information representative of a segmentor is selected among a subset of segmentors, and therefore its encoding size remains reasonable.

According to an embodiment, the item of information representative of a segmentor comprises an index of said segmentor, said index being encoded taking into account the number of segmentors of said selected subset of segmentors. Advantageously, this item of information can be encoded on a reduced number of bits, and the size of the encoded bitstream is reduced.

According to a fourth aspect, the invention relates to a device for decoding a bitstream comprising an encoded digital image signal represented by a set of digital samples, at least part of the digital image signal being encoded by reference to a reference digital image signal. The device comprises means for applying a segmentor to said reference digital image signal to obtain subsets of digital samples and means for applying a same filter among a set of predetermined filters to each sample of a said subset of digital samples. The decoding device comprises:

means for selecting a subset of segmentors of a predetermined set of segmentors based upon at least one characteristic obtained from said reference digital image signal, and means for obtaining from said bitstream an item of information representative of a segmentor among said selected subset of segmentors to apply to said reference digital image signal.

The particular characteristics and advantages of the decoding device being similar to those of the bitstream decoding method, they are not repeated here.

According to a fifth aspect, the invention relates to a computer program which, when run on a computer, causes the computer to carry out a method for encoding a digital image signal as briefly described above or a method for decoding a bitstream as briefly described above. Such a computer program may be transitory or non transitory. In an implementation, the computer program can be stored on a non-transitory computer-readable carrier medium. The particular characteristics and advantages of the device for encoding a digital image signal, and of the computer program being similar to those of the digital image signal encoding method, they are not repeated here.

According to a sixth aspect, the invention relates to a bitstream representative of an encoded digital image signal represented by a set of digital samples, at least part of the digital image signal being encoded by reference to a reference digital image signal. The bitstream comprises an item of information representative of a segmentor determined among a selected subset of segmentors, wherein a said segmentor is applied to said reference digital image signal to obtain subsets of digital samples and a same filter among a set of predetermined filters is applied to each sample of a said subset of digital samples. Such a bitstream can be stored on a non-transitory computer-readable carrier medium.

Advantageously, the number of bits of the bitstream is reduced as compared to the number of bits needed to encode an item of information representative of a segmentor which is not determined among a subset of selected segmentors. Since this item information contributes to the filtering information for encoding, the number of bits necessary to encode the filtering information is also reduced.

BRIEF DESCRIPTION OF THE DRAWINGS

Other features and advantages will appear in the following description, which is given solely by way of non-limiting example and made with reference to the accompanying drawings, in which:

FIG. 4 illustrates the segmentation of a block of samples into subsets of samples using a segmentor;

FIG. 5 illustrates an example of context function support;

DETAILED DESCRIPTION OF THE EMBODIMENTS

Figure 1:
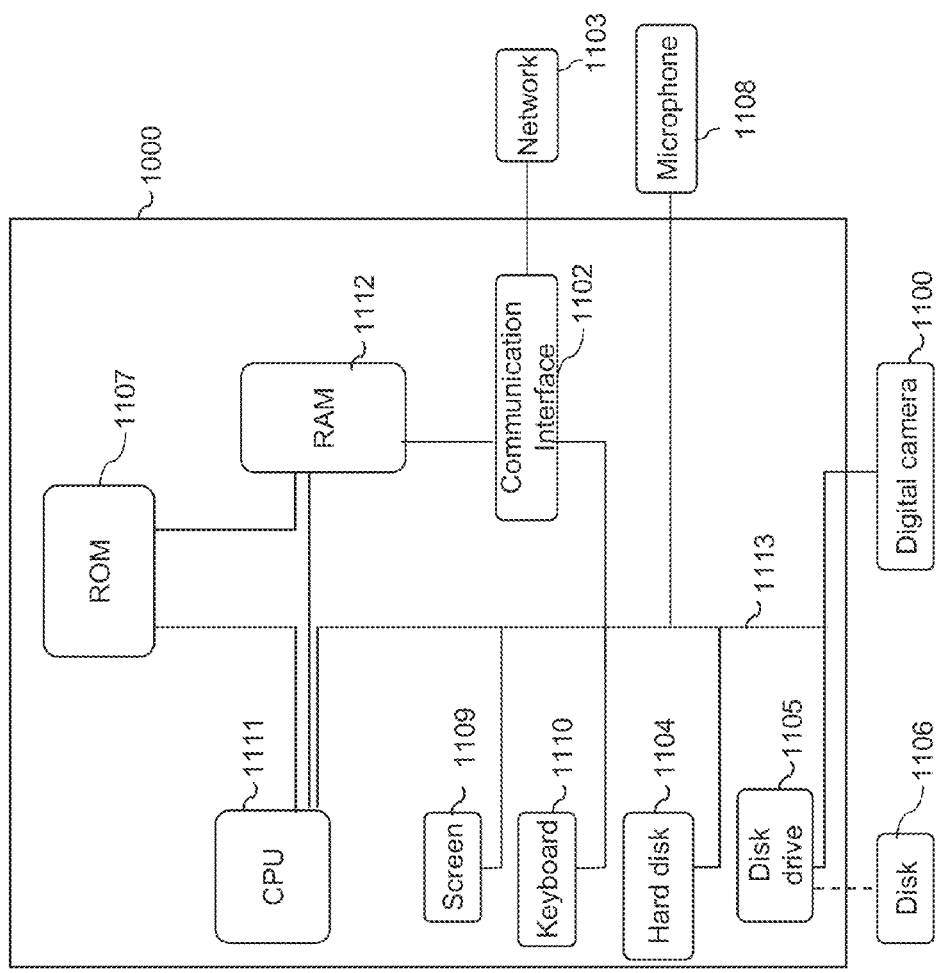
FIG. 1 is a diagram of a processing device adapted to implement an embodiment of the present invention.

FIG. 1 illustrates a diagram of a processing device 1000 adapted to implement one embodiment of the present invention. The apparatus 1000 is for example a micro-computer, a workstation or a light portable device.

The apparatus 1000 comprises a communication bus 1113 to which there are preferably connected:

a central processing unit 1111, such as a microprocessor, denoted CPU;

a read only memory 1107 able to contain computer programs for implementing the invention, denoted ROM;

a random access memory 1112, denoted RAM, able to contain the executable code of the method of the invention as well as the registers adapted to record variables and parameters necessary for implementing the method of encoding a video signal; and a communication interface 1102 connected to a communication network 1103 over which digital data to be processed are transmitted.

Optionally, the apparatus 1000 may also have the following components:

a data storage means 1104 such as a hard disk, able to contain the programs implementing the invention and data used or produced during the implementation of the invention;

a disk drive 1105 for a disk 1106, the disk drive being adapted to read data from the disk 1106 or to write data onto said disk;

a screen 1109 for displaying data and/or serving as a graphical interface with the user, by means of a keyboard 1110 or any other pointing means.

The apparatus 1000 can be connected to various peripherals, such as for example a digital camera 1100 or a microphone 1108, each being connected to an input/output card (not shown) so as to supply multimedia data to the apparatus 1000.

The communication bus affords communication and interoperability between the various elements included in the apparatus 1000 or connected to it. The representation of the bus is not limiting and in particular the central processing unit is able to communicate instructions to any element of the apparatus 1000 directly or by means of another element of the apparatus 1000.

The disk 1106 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a digital image signal and/or the method of decoding a compressed bitstream according to the invention to be implemented.

The executable code may be stored either in read only memory 1107, on the hard disk 1104 or on a removable digital medium such as for example a disk 1106 as described previously. According to a variant, the executable code of the programs can be received by means of the communication network, via the interface 1102, in order to be stored in one of the storage means of the apparatus 1000 before being executed, such as the hard disk 1104.

The central processing unit 1111 is adapted to control and direct the execution of the instructions or portions of software code of the program or programs according to the invention, instructions that are stored in one of the aforementioned storage means. On powering up, the program or programs that are stored in a non-volatile memory, for example on the hard disk 1104 or in the read only memory 1107, are transferred into the random access memory 1112, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 2:
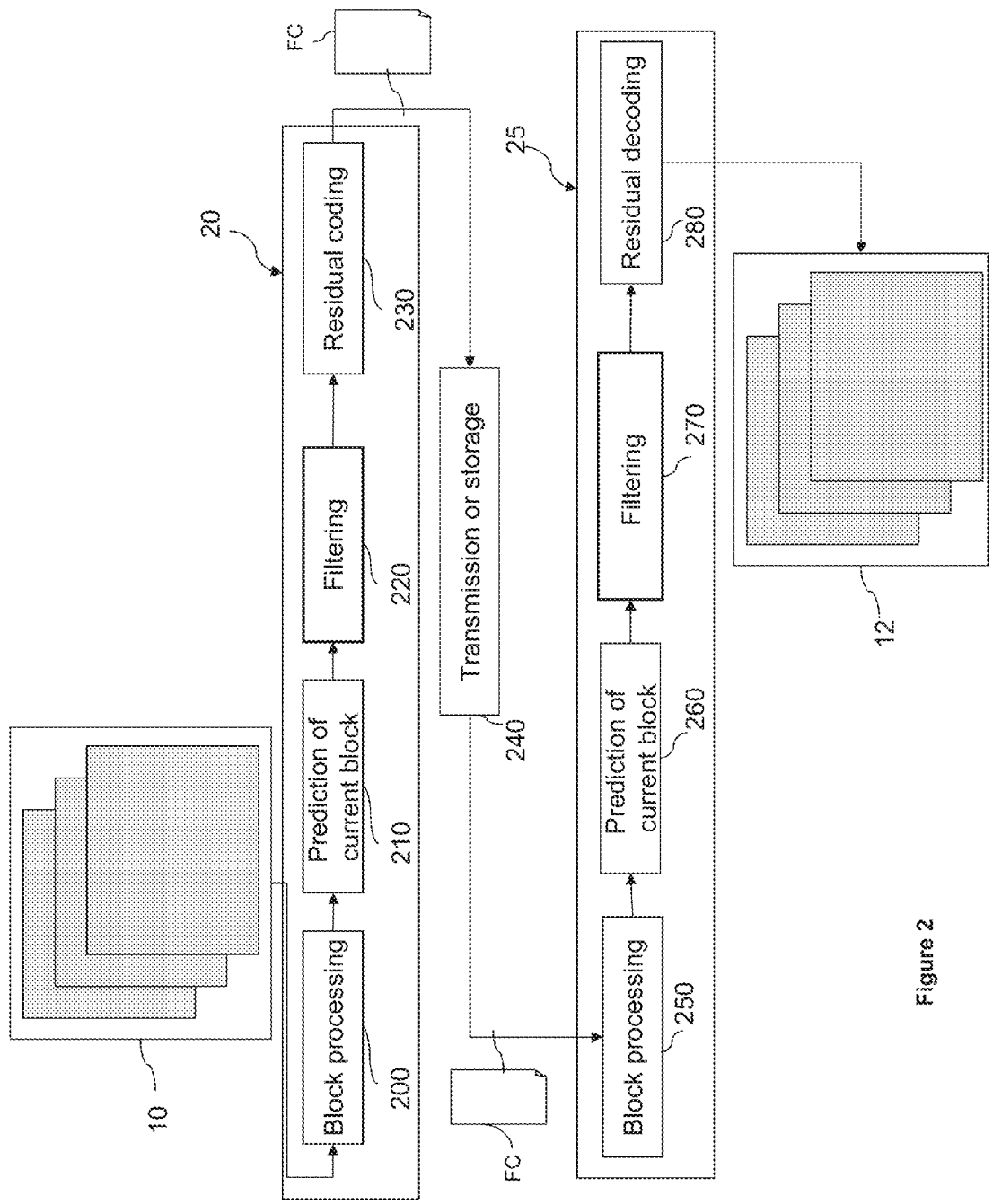
FIG. 2 illustrates a system for processing a digital signal in which the invention is implemented.

FIG. 2 illustrates a system for processing digital image signals (e.g. still digital images or videos), comprising an encoding device 20, a transmission or storage unit 240 and a decoding device 25.

The embodiment described in particular is dedicated to video coding. However, a similar embodiment for the coding of a still digital image may be easily deduced by a skilled person.

Both the encoding device and the decoding device are processing devices 1000 as described with respect to FIG. 1.

An original video signal 10 is provided to the encoding device 20 which comprises several modules: block processing 200, prediction of current block 210, filtering 220 and residual encoding 230. Only the modules of the encoding device which are relevant for an embodiment of the invention are represented.

The original video signal 10 is processed in units of blocks, as described above with respect to various MPEG-type video compression formats such as H.264 and MPEG-4 for example. So firstly, each video frame is divided into blocks by module 200. Next, for each current block, module 210 determines a block predictor or reference block. The reference block is either a reference block obtained from one or several reference frames of the video signal, or a block obtained from the same frame as the current block, via an Intra prediction process. For example, H.264 standard compression format, well known in the field of video compression, describes in detail Inter and Intra prediction mechanisms.

In some embodiments, the reference block is selected from an interpolated version of a reference frame of the video signal, as proposed for example in the sub-pixel motion compensation described in H.264 video compression format.

The reference block or predictor block obtained by the prediction module 210 is next filtered according to an embodiment of the invention by the filtering module 220. The filtering module applies a parameterized filtering process, determined by a plurality of parameters.

In an embodiment, each time the filtering is applied, a subset of filters is selected from a larger set of possible filters and applied to the reference block. To select the subset of filters, first the block to be filtered is segmented by a segmentor, so that each sample of the block to be filtered is classified in a segmented area. A filter of the set of possible filters is associated to each segmented area, based upon a predetermined cost criterion. For example, the filter among the set of possible filters which minimizes a rate-distortion cost is selected for a given area.

In an embodiment, the filtering may be applied iteratively a number of times. The filtering process can be defined by a plurality of parameters, the first parameter being the number of filtering iterations, if any, and the second parameters being representative of the segmentor and of the associated filters.

Advantageously, according to an embodiment of the invention, a large number of segmentors may be used to better adapt to the characteristics of the block to be filtered. To further optimize the encoding cost, a subset of segmentors is selected for the block to be filtered, and then one segmentor among the subset of segmentors is selected and applied for the actual filtering. Consequently, the number of computations performed by the filtering module 220 is reduced since only a subset of segmentors need to be tested, and the quantity of information to transmit to the decoder may also be reduced since only a parameter representative of a segmentor among a subset of segmentors is transmitted to the decoder.

The result of the filtering module is a filtered reference block which is subtracted from the current block to obtain a residual block. The residual block is encoded by module 230.

The block prediction 210, filtering 220 and residual block coding 230 are applied for the blocks of a current frame of the video signal. It may be noted that for some blocks, a SKIP mode may be chosen for encoding, meaning that it is not necessary to encode any residual data. For those blocks the modules 220 and 230 are not applied.

Finally, a compressed bitstream FC is obtained, containing the encoded residuals and other data relative to the encoded video and useful for decoding. In particular, information relative to the filtering applied by the filtering module 220 is transmitted to the decoder.

The compressed bitstream FC comprising the compressed video signal may be stored in a storage device or transmitted to a decoder device by module 240.

In a particular embodiment, the compressed bitstream is stored in a file, and the decoding device 25 is implemented in the same processing device 1000 as the encoding device 20.

In another embodiment, the encoding device 20 is implemented in a server device, the compressed bitstream FC is transmitted to a client device via a communication network 1103, for example the Internet network or a wireless network, and the decoding device 25 is implemented in a client device.

It is supposed that the transmission and/or storage is lossless, so that no errors occur, and the compressed bitstream can be subsequently completely decoded.

The decoding device 25 comprises a block processing module 250, which retrieves the block division from the compressed bitstream and selects the blocks to process. For each block, a predictor block or initial reference block is found by module 260, by decoding information relative to the prediction which has been encoded in the compressed bitstream, for example an index of a reference frame and a motion vector in case of Inter prediction, or an indication of a Intra prediction mode in case of Intra prediction.

The filtering process determined and applied at the encoder is also applied at the decoder by the filtering module 270.

Advantageously, the filtering module 270 applies a selection of a subset of segmentors among a large set of segmentors for each block to be filtered. Information about the selected segmentor among the subset is decoded from the compressed bitstream, and then the filtering process is applied by module 270.

The residual block corresponding to the current block is decoded by the residual decoding module 280 and added to the filtered reference block obtained from module 270.

Finally, a decoded video signal 12 which can be displayed or further processed is obtained.

Figure 3:
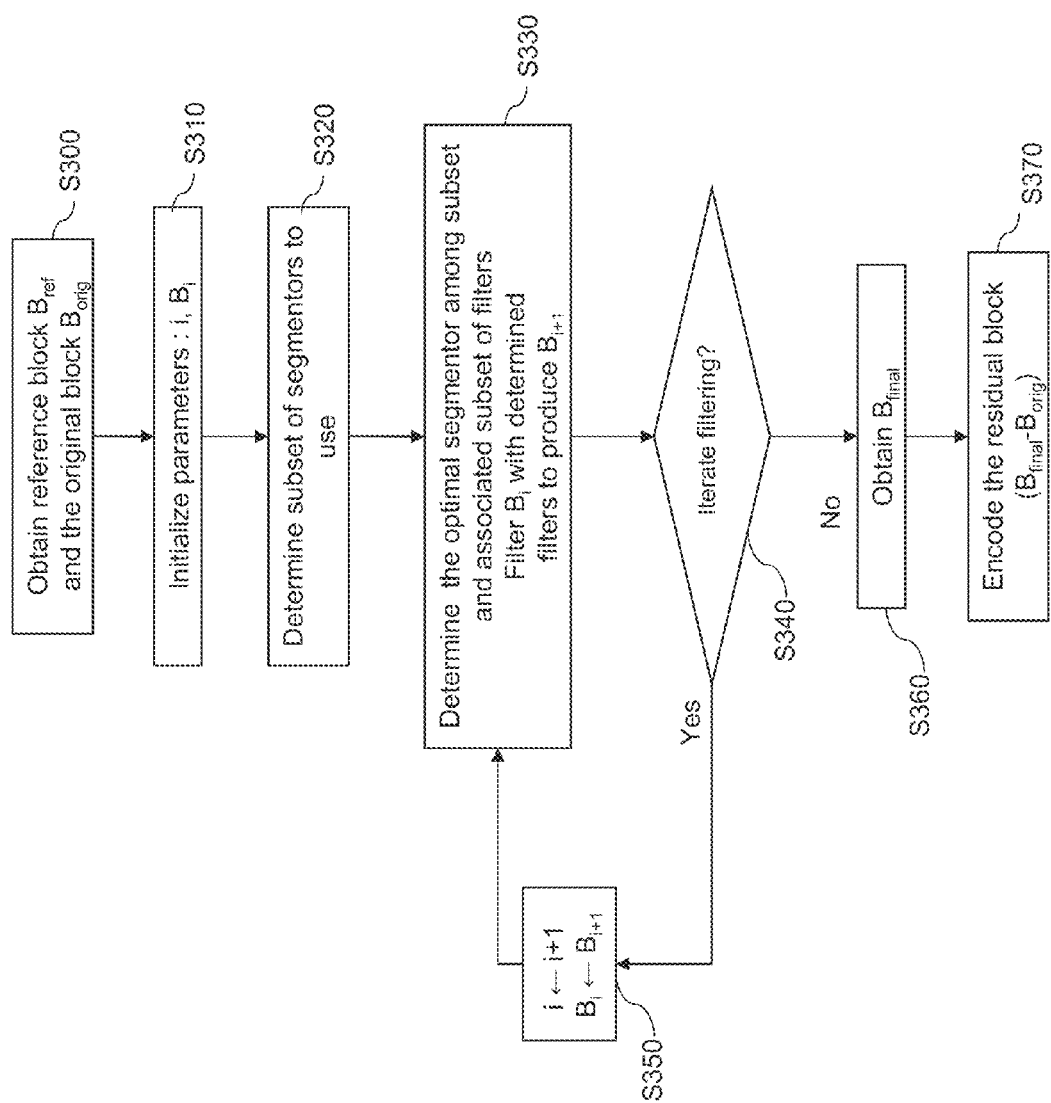
FIG. 3 illustrates the main steps of an encoding method according to an embodiment of the invention.

The flow diagram in FIG. 3 illustrates the main steps of an encoding method of a digital image signal as implemented by the filtering module 220.

All the steps of the algorithm represented in FIG. 3 can be implemented in software and executed by the central processing unit 1111 of the device 1000.

The algorithm of FIG. 3 is illustrated for the processing of a given block, since the processing is sequential and carried out block by block.

Firstly, a current block $B_{orig}$ to be encoded of the current frame, also called an original block, and its initial reference block for prediction $B_{ref}$ are obtained at step S300. The block $B_{orig}$ could be of any possible size, but in a preferred embodiment, the sizes recommended in H.264 video coding standard are preferably used: 16×16 pixels, 8×8 pixels, 4×4 pixels or some rectangular combinations of these sizes. The initial reference block $B_{ref}$, as specified earlier, may either be a reference block from a reference frame different from the current frame, which has been obtained by motion estimation, or a block obtained by spatial prediction from the current frame, for example by using one of the Intra-prediction modes of H.264. Other methods of obtaining $B_{ref}$ are possible, such as performing a linear combination of several blocks from several previously decoded frames, or extracting a reference block from oversampled previously decoded frames.

Step S300 is followed by initializing step S310 carrying out the initialization of various variables and parameters of the algorithm. The initialization step will be described in more detail hereafter with respect to the embodiment of FIGS. 8a and 8b. In particular, a counter of iterations i is set to 0 and a current block to process $B_i$ is set to $B_{ref}$.

Step S310 is followed by the determining of a subset of segmentors among an initial set of segmentors for the current block being processed $B_i$, based upon one or several characteristics of the initial reference block $B_{ref}$. A segmentor, when applied to a current block of samples Bi, segments the block into a given number of areas or subsets of samples, as illustrated in FIG. 4. The block 410 of FIG. 4 is segmented or divided into 4 areas 412, 414, 416 and 418. The samples belonging to a given area have an associated segmentation value from 0 to 3.

For example, a segmentor is a context function, which, for a given sample of a block, takes into account values of the neighouring samples and outputs a segmentation value or context value. Such context function may capture local characteristics of the signal. It is advantageous to consider a plurality of context functions.

In an embodiment, a set of context functions can be defined for a given sample x(i,j) situated on the $i^{th}$ line and the $j^{th}$ column, as a function of the values of the neighbouring sample A, B, C, D which are respectively situated at spatial position (i−1,j), (i,j−1), (i, j+1), (i+1,j), as illustrated in FIG. 5.

In order to have a relatively simple representation, all context functions used return a value amongst a predetermined set of values, also called the context values.

For example, the following set of 16 context functions $C_0$ to $C_{15}$, each taking values in the set {0, 1, 2, 3}, may be used:

$C_0(x(i, j)) = 0$ if $A \leq B$ and $A \leq C$
$\phantom{C_0(x(i, j)) =} 1$ if $A \leq B$ and $A > C$
$\phantom{C_0(x(i, j)) =} 2$ if $A > B$ and $A \leq C$
$\phantom{C_0(x(i, j)) =} 3$ if $A > B$ and $A > C$ $C_1(x(i, j)) = 0$ if $A \leq B$ and $A \leq D$
$\phantom{C_1(x(i, j)) =} 1$ if $A \leq B$ and $A > D$
$\phantom{C_1(x(i, j)) =} 2$ if $A > B$ and $A \leq D$
$\phantom{C_1(x(i, j)) =} 3$ if $A > B$ and $A > D$ $C_2(x(i, j)) = 0$ if $A \leq B$ and $B \leq C$
$\phantom{C_2(x(i, j)) =} 1$ if $A \leq B$ and $B > C$
$\phantom{C_2(x(i, j)) =} 2$ if $A > B$ and $B \leq C$
$\phantom{C_2(x(i, j)) =} 3$ if $A > B$ and $B > C$ $C_3(x(i, j)) = 0$ if $A \leq B$ and $B \leq D$
$\phantom{C_3(x(i, j)) =} 1$ if $A \leq B$ and $B > D$
$\phantom{C_3(x(i, j)) =} 2$ if $A > B$ and $B \leq D$
$\phantom{C_3(x(i, j)) =} 3$ if $A > B$ and $B > D$ $C_4(x(i, j)) = 0$ if $A \leq B$ and $C \leq D$
$\phantom{C_4(x(i, j)) =} 1$ if $A \leq B$ and $C > D$
$\phantom{C_4(x(i, j)) =} 2$ if $A > B$ and $C \leq D$
$\phantom{C_4(x(i, j)) =} 3$ if $A > B$ and $C > D$ $C_5(x(i, j)) = 0$ if $A \leq C$ and $A \leq D$
$\phantom{C_5(x(i, j)) =} 1$ if $A \leq C$ and $A > D$
$\phantom{C_5(x(i, j)) =} 2$ if $A > C$ and $A \leq D$
$\phantom{C_5(x(i, j)) =} 3$ if $A > C$ and $A > D$ $C_6(x(i, j)) = 0$ if $A \leq C$ and $B \leq C$
$\phantom{C_6(x(i, j)) =} 1$ if $A \leq C$ and $B > C$
$\phantom{C_6(x(i, j)) =} 2$ if $A > C$ and $B \leq C$
$\phantom{C_6(x(i, j)) =} 3$ if $A > C$ and $B > C$ $C_7(x(i, j)) = 0$ if $A \leq C$ and $B \leq D$
$\phantom{C_7(x(i, j)) =} 1$ if $A \leq C$ and $B > D$
$\phantom{C_7(x(i, j)) =} 2$ if $A > C$ and $B \leq D$
$\phantom{C_7(x(i, j)) =} 3$ if $A > C$ and $B > D$ $C_8(x(i, j)) = 0$ if $A \leq C$ and $C \leq D$
$\phantom{C_8(x(i, j)) =} 1$ if $A \leq C$ and $C > D$
$\phantom{C_8(x(i, j)) =} 2$ if $A > C$ and $C \leq D$
$\phantom{C_8(x(i, j)) =} 3$ if $A > C$ and $C > D$ $C_9(x(i, j)) = 0$ if $A \leq D$ and $B \leq C$
$\phantom{C_9(x(i, j)) =} 1$ if $A \leq D$ and $B > C$
$\phantom{C_9(x(i, j)) =} 2$ if $A > D$ and $B \leq C$
$\phantom{C_9(x(i, j)) =} 3$ if $A > D$ and $B > C$ $C_{10}(x(i, j)) = 0$ if $A \leq D$ and $B \leq D$
$\phantom{C_{10}(x(i, j)) =} 1$ if $A \leq D$ and $B > D$
$\phantom{C_{10}(x(i, j)) =} 2$ if $A > D$ and $B \leq D$
$\phantom{C_{10}(x(i, j)) =} 3$ if $A > D$ and $B > D$ $C_{11}(x(i, j)) = 0$ if $A \leq D$ and $C \leq D$
$\phantom{C_{11}(x(i, j)) =} 1$ if $A \leq D$ and $C > D$
$\phantom{C_{11}(x(i, j)) =} 2$ if $A > D$ and $C \leq D$
$\phantom{C_{11}(x(i, j)) =} 3$ if $A > D$ and $C > D$ $C_{12}(x(i, j)) = 0$ if $B \leq C$ and $B \leq D$
$\phantom{C_{12}(x(i, j)) =} 1$ if $B \leq C$ and $B > D$
$\phantom{C_{12}(x(i, j)) =} 2$ if $B > C$ and $B \leq D$
$\phantom{C_{12}(x(i, j)) =} 3$ if $B > C$ and $B > D$ $C_{13}(x(i, j)) = 0$ if $B \leq C$ and $C \leq D$
$\phantom{C_{13}(x(i, j)) =} 1$ if $B \leq C$ and $C > D$
$\phantom{C_{13}(x(i, j)) =} 2$ if $B > C$ and $C \leq D$
$\phantom{C_{13}(x(i, j)) =} 3$ if $B > C$ and $C > D$ $C_{14}(x(i, j)) = 0$ if $B \leq D$ and $C \leq D$
$\phantom{C_{14}(x(i, j)) =} 1$ if $B \leq D$ and $C > D$
$\phantom{C_{14}(x(i, j)) =} 2$ if $B > D$ and $C \leq D$
$\phantom{C_{14}(x(i, j)) =} 3$ if $B > D$ and $C > D$ $C_{15}(x(i, j)) = 0$ if $B \leq x(i, j)$ and $C \leq D$
$\phantom{C_{15}(x(i, j)) =} 1$ if $B \leq x(i, j)$ and $C > D$
$\phantom{C_{15}(x(i, j)) =} 2$ if $B > x(i, j)$ and $C \leq D$
$\phantom{C_{15}(x(i, j)) =} 3$ if $B > x(i, j)$ and $C > D$ Alternatively, other context functions, taking into account the values of other samples from the neighbourhood and taking a different number of context values, for example only two values, may be applied.

Considering the 16 context functions described above, for the current block $B_i$, a subset of usable context functions, for example {C1, C3, C5, C7} is selected in step S320. The subset of segmentors is selected based upon at least one characteristic of $B_{ref}$, either an encoding mode associated with $B_{ref}$ or some intrinsic characteristic of the digital image signal of $B_{ref}$. Detailed embodiments of step S320 will be given hereafter with respect to FIGS. 8a and 8b.

Next, in step S330, an optimal segmentor for the current block is determined among the subset of segmentors previously selected, and an associated subset of filters which are used to obtain a filtered block $B_{i+1}$.

Figure 7:
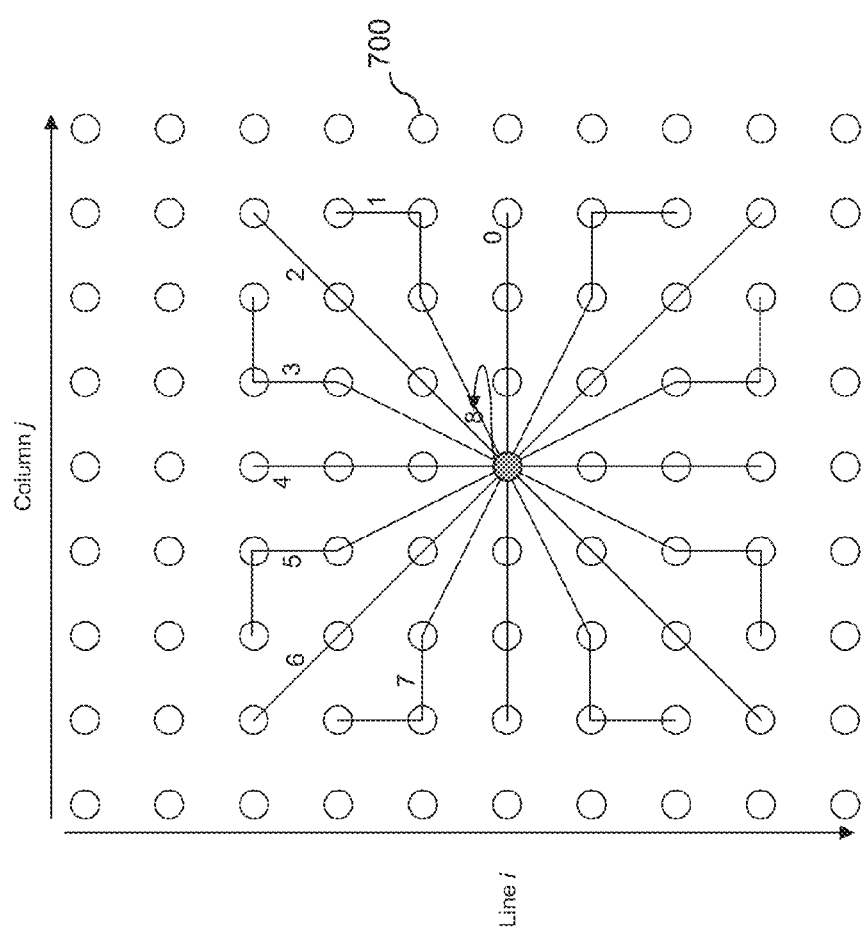
FIG. 7 illustrates an example of filtering according to eight predefined geometric orientations.

In the preferred embodiment, oriented filters are used as illustrated in FIG. 7. For a given segmentor and a given block $B_i$, a subset of the set of oriented filters is selected, each filter being associated with a segmented area.

Figure 6:
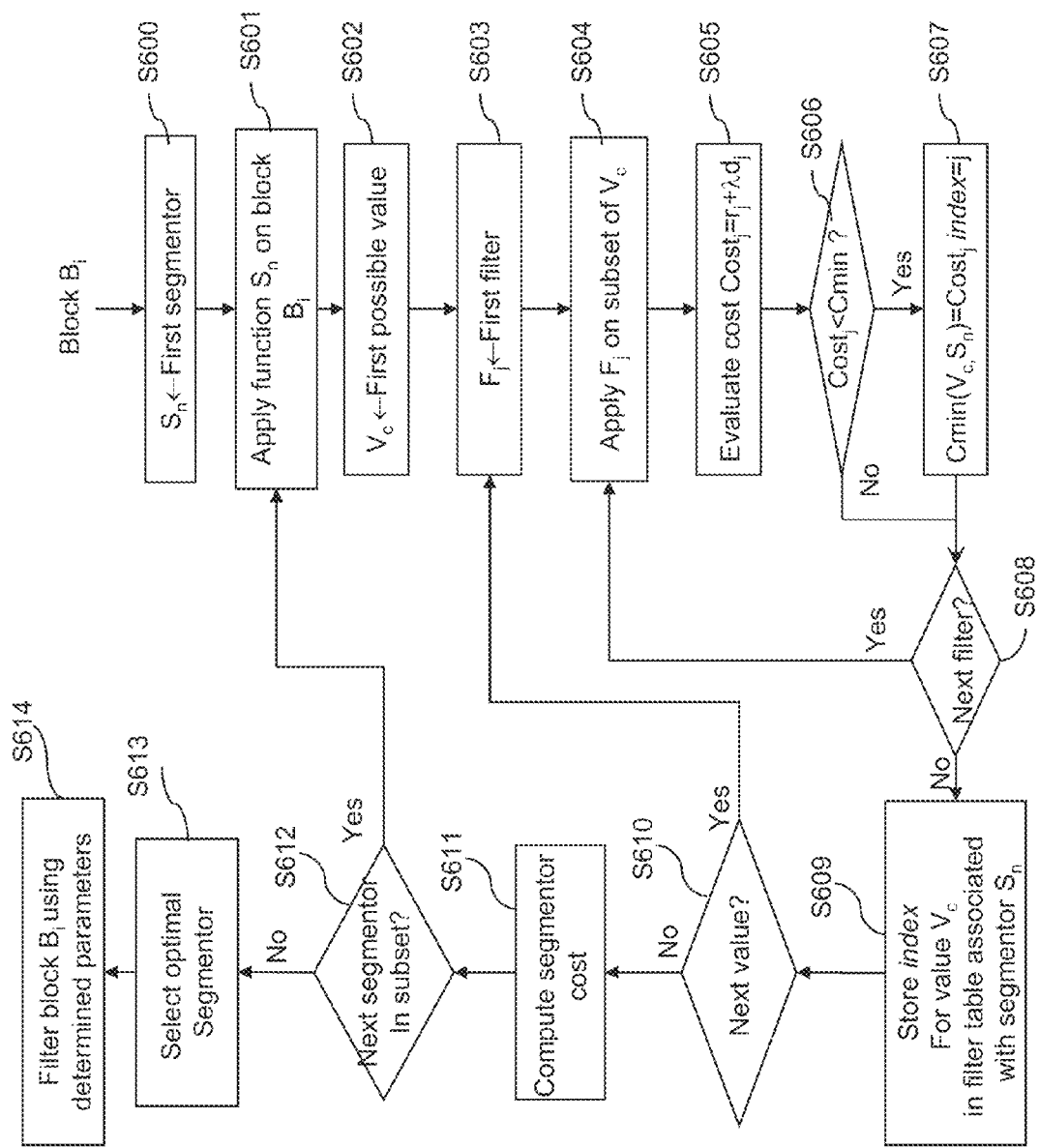
FIG. 6 illustrates the main steps of a method for determining an optimal segmentor and an associated filter table according to an embodiment of the invention.

The method according to an embodiment of the invention determines an optimal filter among a predetermined set of filters for each subset of samples belonging to the same area obtained by segmentation, as explained in detail with respect to FIG. 6.

In the preferred embodiment, the set of filters is composed of 9 filters, illustrated schematically in FIG. 7. The set includes 8 oriented filters and an additional filter, the identity filter, $F_{id}$. The identity filter $F_{id}$ corresponds to no filtering. Including the identity filter makes it possible to select the samples which should be filtered and to keep some samples un-filtered when the filtering does not bring any rate-distortion improvement. The sample to be filtered is pixel $x(i,j)$ situated on the $i^{th}$ line and the $j^{th}$ column. The lines labeled 0 to 7 in FIG. 7 correspond to the supports of the filters $F_0$ to $F_7$, that is to say the set of pixels used in the linear filtering operation. Those 8 filters linearly combine 7 samples, so they have a support of size 7. The identity filter $F_{id}$ has a support of size 1.

For example, the filters are:
$F_0$=a.x(i,j)+b.(x(i,j+1)+x(i,j−1))+c.(x(i,j+2)+x(i,j−2))+d.(x(i,j+3)+x(i,j−3))
$F_1$=a.x(i,j)+b.(x(i−1,j+2)+x(i+1,j−2))+c.(x(i−1,j+3)+x(i+1,j−3))+d.(x(i−2,j+3)+x(i+2,j−3))
$F_2$=a.x(i,j)+b.(x(i−1,j+1)+x(i+1,j−1))+c.(x(i−2,j+2)+x(i+2,j−2))+d.(x(i−3,j+3)+x(i+3,j−3))
$F_3$=a.x(i,j)+b.(x(i+2,j−1)+x(i−2,j+1))+c.(x(i+3,j−1)+x(i−3,j+1))+d.(x(i+3,j−2)+x(i−3,j+2))
$F_4$=a.x(i,j)+b.(x(i+1,j)+x(i−1,j))+c.(x(i+2,j)+x(i−2,j))+d.(x(i+3,j)+x(i−3,j))
$F_5$=a.x(i,j)+b.(x(i+2,j+1)+x(i−2,j−1))+c.(x(i+3,j+1)+x(i−3,j−1))+d.(x(i+3,j+2)+x(i−3,j−2))
$F_6$=a.x(i,j)+b.(x(i+1,j+1)+x(i−1,j−1))+c.(x(i+2,j+2)+x(i−2,j−2))+d.(x(i+3,j+3)+x(i−3,j−3))
$F_7$=a.x(i,j)+b.(x(i−1,j−2)+x(i+1,j+2))+c.(x(i−1,j−3)+x(i+1,j+3))+d.(x(i−2,j−3)+x(i+2,j+3))
$F_8$=$F_{id}$=x(i,j)

where a, b, c, d have predefined values for all filters of the set.

In an alternative embodiment, a, b, c, d may take different values for different filters.

It is advantageous to use oriented filters $F_0$ to $F_7$ because they are adapted to filter accurately local areas containing oriented edges. The final set from which the filters may be selected contains 9 filters in this example, including the identity filter.

In order to determine an optimal segmentor and the associated filter table, in the preferred embodiment, a predetermined rate is firstly associated with each filter of the set of filters.

For example, the following rate assignment is proposed:

$$r_i = \text{Rate}(F_i) = \begin{cases} \alpha & \text{if } F_i \text{ is the identity filter} \\ \beta, \alpha \neq \beta & \text{otherwise} \end{cases}$$

where $\alpha$ and $\beta$ are predetermined values. For example, the following values may be taken: $(\alpha, \beta)=(0.51, 4.73)$, which is more favorable to the case where the identity filter is often chosen, i.e. the image or video comprises many flat areas.

Step S330 of FIG. 3 is followed by a test (S340) checking whether the filtering process should be iterated. In a simple embodiment, a predetermined number of iterations $I_{max}$ is applied, so step S340 consists in checking whether the number of iterations has been reached. If more iterations should be carried out, step S340 is followed by step S350, which updates the variables: i is increased by 1, and the current block to be processed B, is set equal to the filtered block $B_{i+1}$.

If no more iterations should be carried out, a final filtered block, $B_{final}$ is obtained at step S360. In a simple embodiment, $B_{final}$ is the last filtered block $B_{i+1}$.

Finally, the difference between the original block to be coded and the final reference block is obtained and coded at step S370.

An implementation of step S330 is described in detail with respect to the flowchart of FIG. 6. All the steps of the algorithms represented in FIG. 6 can be implemented in software and executed by the central processing unit 1111 of the device 1000.

The aim of the processing is to select and designate, for each pixel or sample of the block $B_i$, a filter among a predetermined set of filters, so as to satisfy a given optimization criterion which is, in this embodiment, minimizing a rate-distortion cost criterion when applying the selected filter to the pixels of the block for which a context function takes a given value.

In this embodiment, a set of oriented filters is used, as explained above with respect to FIG. 7.

The algorithm of FIG. 6 takes as an input the current input reference block $B_i$ and the corresponding original block to be predicted $B_{orig}$.

In the first step S600, the first segmentor amongst the set of segmentors to be tested is selected as the current segmentor $S_n$. For example, a segmentor may be a context function as explained above.

At step S601 the segmentor $S_n$ is applied to all samples of the block $B_i$, and the block $B_i$ is segmented into areas or subsets of samples.

Each sample of the block $B_i$ has an associated segmentation value using segmentor $S_n$. In some cases, the samples having a given associated value may not be adjacent.

Step S601 is followed by step S602, in which the first possible segmentation value is taken as the current value $V_c$.

Next the first filter of the set of filters is taken as the current filter $F_j$ (step S603), and is applied to all samples of the subset of samples having an associated value equal to $V_c$ at step S604.

A rate-distortion cost or filtering cost associated with filter $F_j$ of the subset of samples of area $V_c$ of segmentor $S_n$ is then calculated at step S605, according to the formula: $Cost_j = r_j + \lambda d_j$, where $r_j$ designates the rate of filter $F_j$ determined as previously explained and $d_j$ is a distortion between the subset of filtered samples being processed and the corresponding samples of the original digital signal $B_{orig}$.

The distortion $d_j$ is simply computed as the square error between the values of the filtered samples and the corresponding values of the original samples. Another alternative distortion calculation, such as the sum of absolute differences, may be used.

It should be noted that alternatively, other cost criteria can be applied such as minimizing the rate, minimizing the distortion or minimizing a cost relating to complexity. For example, the cost relating to complexity can be a compromise between the distortion and the number of operations required to decode the block.

The rate-distortion cost value $Cost_j$ calculated is then compared to a value $Cmin(V_c, S_n)$ at step S606.

If $Cost_j$ is lower than $Cmin(V_c, S_n)$ (test S606) or if the current filter is the first filter of the filter set (j=0) to be tested for value $V_c$ of segmentor $S_n$, $Cmin(V_c, S_n)$ is set equal to $Cost_j$ and a variable index is set equal to j at step S607. The variable index stores the index j of the best filter $F_j$, i.e. the filter whose application results in the lowest rate-distortion cost.

If the outcome of the test S606 is negative or after step S607, the test S608 verifies if there is a remaining filter to evaluate, i.e. if the current filter index j is lower than the maximum filter index, equal to 8 in the example of FIG. 7, in the set of predetermined filters.

In case there is a remaining filter, the filter index j is increased at step S608, and steps S604 to S607 are applied again, with the following filter $F_j$ as current filter.

If all the filters have been evaluated, including the identity filter $F_{id}$, step S608 is followed by step S609 at which the value of the index variable is stored for the current value $V_c$ of the segmentor $S_n$. For example, the index value is stored in a table called filter table, associated with the segmentor $S_n$. The value index designates the filter $F_{index}$ which minimizes the filtering cost for the current segmentor $S_n$ and value $V_c$.

Next, it is checked at step S610 whether there is a remaining area value to be processed, i.e. using the set of possible values associated to the segmented areas, if the current value $V_c$ is less than the maximum values. For example, using the set of context functions described above as segmentors, the maximum context value is 3.

In case there are more segmented areas to be processed, the next associated value is taken as the current value $V_c$ and the processing returns to step S603.

If all the areas have been processed, it means that the filter table associated with the segmentor $S_n$ is complete.

Using the example above, since each context function may take only four values 0, 1, 2 and 3, a filter table is simply a list of four filter indexes. An example of filter table is $T(B_i, C_n) = [4, 0, 1, 8]$. A sample $x(i,j)$ of block $B_i$ should be filtered with: $F_4$ if the context function takes value 0 on $x(i,j)$, $F_0$ if the context function takes value 1 on $x(i,j)$, $F_1$ if the context function takes value 2 on $x(i,j)$ and $F_8$ if the context function takes value 3 on $x(i,j)$.

The filtering cost $Cmin(V_c, S_n)$ corresponding to each optimal filter for each segmented area or subset of samples of the reference block for which the segmentor $S_n$ outputs a same value $V_c$ is also stored in memory.

Next, the cost of the segmentor $S_n$, $cost(S_n)$ is computed at step S611, as the sum of the costs $Cmin(V_c, S_n)$ for all values $V_c$.

The rate of the description of the segmentor is also added. The rate associated to a segmentor depends on the number of usable segmentors selected as the subset of segmentors for block $B_i$ at step S320.

The cost associated with the segmentor 5, is stored in memory, along with the filter table associated with $S_n$.

Next it is checked if there are other segmentors in the selected subset of segmentors to process at step S612. Advantageously, the number of calculations is decreased since only a subset of segmentors is tested.

In case of positive answer, the following segmentor of the selected subset is considered as the current segmentor $S_n$, and the processing returns to step S601.

If all the segmentors of the subset have been processed, step S612 is followed by step S613 at which the optimal segmentor for the current block $B_i$ is selected according to a selection criterion.

In the preferred embodiment, the segmentor having the lowest cost among $cost(S_n)$ is chosen as the optimal segmentor. If several segmentors have the same cost, any of them may be chosen as 'optimal' according to the selection criterion.

Finally, the input reference block $B_i$ is filtered using the filters indicated by the selected segmentor at step S614 to obtain the filtered reference block $B_{i+1}$. First the segmentation value obtained by applying the optimal segmentor on the current sample $x(i,j)$ is computed or retrieved. The index of the filter to be applied is given by the associated filter table based on the segmentation value.

For a pixel to be filtered situated at the edge of block $B_i$, the missing neigbouring values can be replaced by predefined values (e.g. 128), or can be filled by mirroring the value contained inside the block, using axial symmetry over the block edge.

More detailed embodiments of an encoding method applied to a video signal will be described hereafter with respect to FIGS. 8a and 8b.

Figure 8A:
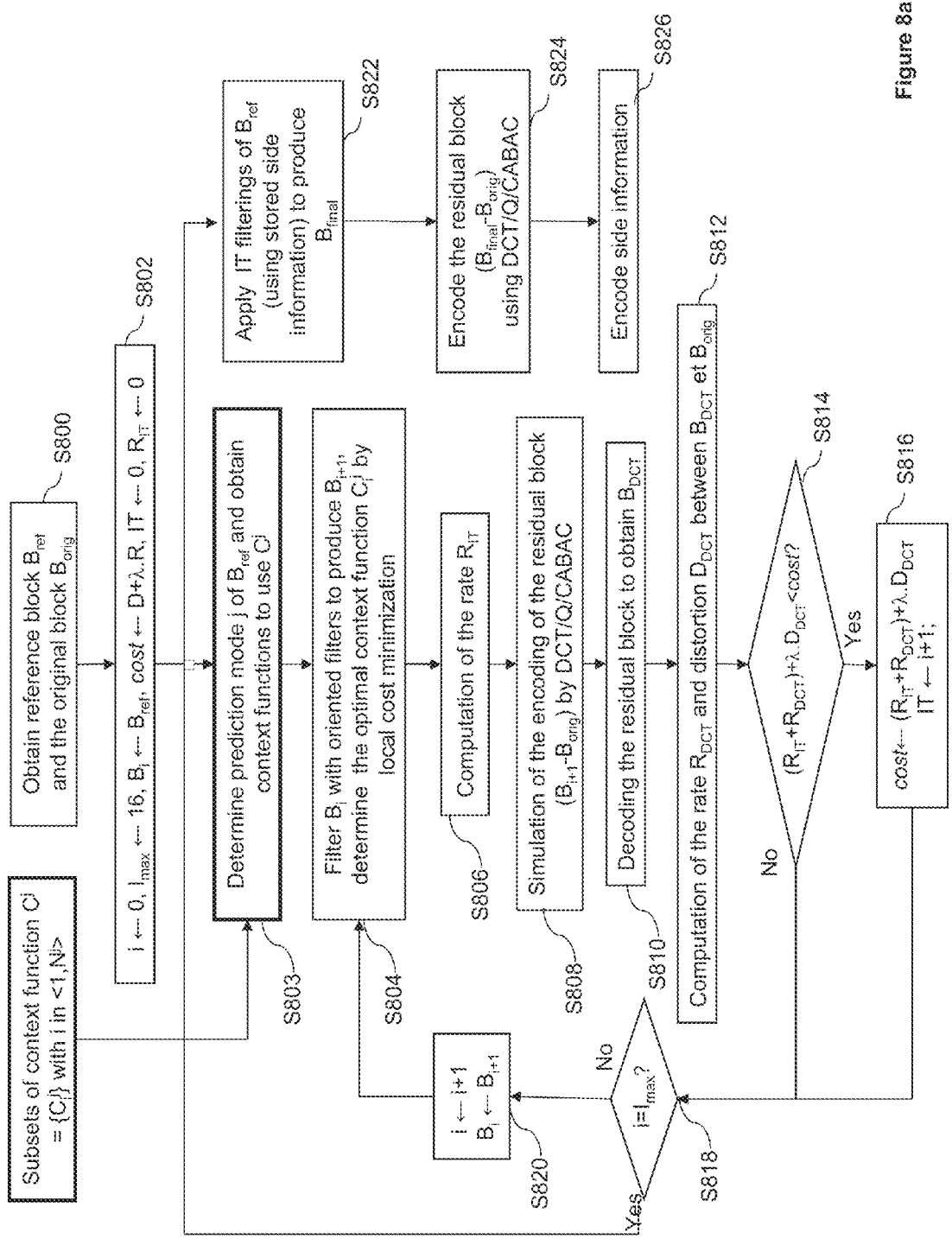
FIGS. 8a and 8b illustrate two embodiments of an encoding method according to the invention using context functions.

The flow diagram in FIG. 8a illustrates the main steps of an encoding method of a video signal including the selection of a subset of segmentors for filtering a reference block as implemented by the filtering module 220.

All the steps of the algorithm represented in FIG. 8a can be implemented in software and executed by the central processing unit 1111 of the device 1000.

The algorithm of FIG. 8a is illustrated for the processing of a given block, since the processing is sequential and carried out block by block.

As an input, a set of context functions are provided as an initial set of segmentors. For example, the set of 16 context functions already described is provided as an input.

Further, several predetermined subsets of the initial set of context functions are also provided, noted $C^j$.

In this embodiment, nine predefined subsets of the initial set of context functions are available, each set $C^j$ corresponding to one of the nine possible modes of predictions existing in the Intra block coding process of the H.264 international standard. For instance, these 9 sets $C^j$ may be:

$C^0=\{C1, C3, C8\}$
$C^1=\{C1, C12, C14, C15\}$
$C^2=\{C4, C5, C9, C10\}$
$C^3=\{C0, C2\}$
$C^4=\{C6, C7, C11, C13\}$
$C^5=\{C0, C2, C7\}$
$C^6=\{C14\}$
$C^7=\{C0, C1, C4\}$
$C^8=\{C6, C14\}$ where the index j corresponds to the intra prediction mode reference in H.264.

As already described, the goal of one context function is to segment an input block into a given number of different areas, for example 4 areas using the example of context functions above. To each area will be applied one filter among the list described previously. With the example of context functions above, there will be at most 4 different filters used over the pixels of the block, each filter associated with one segmented area. The main reason for having different sets of context functions for each possible mode of prediction is that each mode of prediction produces a reference block that has very specific signal characteristics. In H.264 prediction modes, each prediction mode extends the signal in a certain direction. Therefore, it makes sense to use a context function that is specifically adapted to the characteristics of the reference block provided by the prediction mode.

Similarly to step S300 of FIG. 3, an original block to be coded $B_{orig}$ and an initial reference block $B_{ref}$ are obtained at step S600.

Step S600 is followed by initializing step S602 carrying out the initialization of various variables and parameters of the algorithm, namely:

an index i representing an iteration counter is set to zero;
a current input reference block $B_i$ is set to the content of the initial reference block $B_{ref}$;
a variable 'cost' representing the encoding cost is set to the cost of the original block encoding by reference to the initial reference block using the classical H.264 encoding without further filtering of the reference block. In practice, the variable cost is set to D+λR, where D and R are respectively the distortion and rate when the block $B_{orig}$ is directly encoded using $B_{ref}$ as a reference block. The parameter λ is predetermined for the current frame or for the whole video signal. This parameter controls the balance between compression and distortion, and typically may take one of the following values [0.005, 0.02, 0.03]. The distortion D is typically the square error between $B_{ref}$ and $B_{orig}$, or alternatively some other measure of distance between the blocks. The rate R is typically the number of bits necessary for encoding the residual block ($B_{ref}-B_{orig}$);
a parameter IT defining the optimum number of iterations for the current block, set to zero;
a variable $R_{IT}$ representing the rate of the side information (see below) for the filtering of the reference block $B_{ref}$ is set to 0; and
a maximum number of iterations $I_{max}$ is set to a predetermined value, for example a value between 1 and 16. In the preferred embodiment, $I_{max}=16$. In an embodiment, the maximum number of iterations is set at the beginning of the processing, for the entire video signal.

After the initialization, the prediction mode used to code the initial reference block $B_{ref}$ is determined at step S803, and a corresponding subset of context functions is obtained. If the prediction mode is mode number j, $C^j$ is selected as the set of usable context functions.

During next step S804, the optimal context function among the selected subset associated to the current block being processed $B_i$ is determined, along with an associated subset of filters, using the algorithm already described with reference to FIG. 6. A filtered reference block $B_{i+1}$ is obtained by filtering the current block $B_i$ with the determined optimal context function and the associated filters, determined using a distortion-rate cost criterion for example as explained above.

The filtering of block $B_i$ is defined by an index P1 of the context function selected for block $B_i$ and a list P2 of filter indexes, a filter index being associated with each value taken by context function P1 on block $B_i$. Together, P1 and P2 form an item of information defining the filtering of iteration of index i. If the current filtering iteration i brings an improvement, as explained hereafter, this item of information is encoded in a side information signal and transmitted to the decoder, so that the decoder applies exactly the same filtering at iteration i.

Consequently, once determined, the item of information comprising P1 and P2 should be kept in memory for subsequent encoding into a side information signal.

The rate of the side information useful to describe one iteration $R_i$ can be computed at each iteration and added to the total side information rate $R_{IT}$ computed at step S806, by applying: $R_{IT}=R_{IT}+R_i$, where $R_i=1+\text{rate}(P1,P2)$.

For a given iteration, the side information comprises firstly a filtering indicator, for example encoded on one bit, indicating whether the current filtering iteration should be applied or not.

If applied, the filtering indicator takes value 1, and the complete side information further comprises parameters P1, indicating the context function selected for block $B_i$ and P2, the list of filters, which may be indicated by their index values, associated with the context values taken by the selected context function.

At next step S808, a simulation of the actual encoding of $B_{orig}$ by reference to $B_{i+1}$ is performed.

For example, the method described in the H.264 video coding standard is applied: a DCT is applied on the residual block ($B_{i+1}-B_{orig}$), followed by a quantization Q and an entropy encoding of CABAC type (Context-Based Adaptive Arithmetic Coding, entropy coding described in H.264 standard compression format). Alternatively, the CAVLC entropy coding (variable length entropy coding also described in the same standard) can be applied. The aim of the simulation step is to obtain the rate $R_{DCT}$ which represents the actual number of bits to be spent for encoding the residual block ($B_{i+1}-B_{orig}$).

Next, at step S810, a decoded block $B_{DCT}$ is obtained, by applying entropy decoding, inverse quantization and inverse DCT transform on the encoded residual block, result of step S808, and adding the decoded residual block to the filtered reference block $B_{i+1}$.

The decoded block $B_{DCT}$ is a modified block, obtained by a lossy modification of the original block $B_{orig}$, the lossy modification being brought by the encoding and decoding the residual block corresponding to the difference between the original block $B_{orig}$ and the current filtered reference block $B_{i+1}$.

At the following step S812, the rate $R_{DCT}$ for encoding the residual block ($B_{i+1}$-$B_{orig}$) is obtained, as well as the distortion $D_{DCT}$ between the decoded simulated decoded block $B_{DCT}$ and the original block to be coded $B_{orig}$.

Next, a criterion taking into account the original block $B_{orig}$ and the modified block $B_{DCT}$ is applied in order to determine whether the current application of the filtering process brings an improvement for the encoding of the current block by reference to the filtered reference block $B_{i+1}$.

In the preferred embodiment, the test S814 checks whether the overall rate-distortion cost decreases or not, therefore checking whether the current iteration of the filtering brings an overall improvement. In practice, the cost $(R_{IT}+R_{DCT})+\lambda D_{DCT}$ is compared to the variable cost previously described.

Alternatively, other cost criteria taking into account the original block and the modified block than the rate-distortion cost may be applied, as mentioned above. For example, other cost criteria may be: minimizing the rate, minimizing the distortion or minimizing a cost relating to complexity. In particular, the cost relating to complexity can be a compromise between the distortion and the number of operations required to decode the block.

If the answer to the test S814 is positive, meaning that the calculated rate-distortion cost taking into account the encoding of the side information necessary to describe the filtering iteration is lower than the previously stored value of the rate-distortion cost for the encoding of the current block $B_{orig}$, step S814 is followed by step S816 at which the variable cost and the variable IT representing the optimal number of iterations are updated. Namely, cost=$(R_{IT}+R_{DCT})+\lambda D_{DCT}$, meaning that the variable cost is set to the current minimum value of the rate-distortion cost. The variable IT is set to i+1.

In case of negative answer at test S814, or after step S816, step S818 is carried out for testing whether the current number of iterations has reached the maximum number of iterations $I_{max}$. If the maximum number of iterations has not been reached, then step S818 is followed by step S820 at which the variable i is increased to i+1, and the current input reference block $B_i$ is set to the filtered reference block $B_{i+1}$. Next, steps S804 to S818 are repeated.

If the maximum number of iterations has been reached (answer 'yes' to test S818), step S818 is followed by step S822, at which the IT filterings are sequentially applied, using the parameters P1 and P2 previously stored for each iteration i, to produce a final reference block $B_{final}$.

Alternatively, $B_{final}$ may be retrieved from memory, if every result of the filtering of the block $B_i$ is stored after step S804.

It should be noted that given a maximum number of iterations tested ($I_{max}$), the number of filterings to obtain the final reference block IT is any number between 0 (no filtering) and $I_{max}$.

Finally, the residual block resulting from the difference between the original block to be coded $B_{orig}$ and the final reference block $B_{final}$ is computed and encoded by applying DCT, quantization and entropy encoding of CABAC type for example as explained previously. The block $B_{orig}$ is therefore encoded by reference to the final reference block $B_{final}$.

Further, an item of information, referred to as side information, for describing whether the final reference block is obtained by applying a filtering process to an input reference block, and in case one or several filterings are applied (e.g. IT>0), for describing the IT filterings to be applied on the reference block $B_{ref}$ to obtain $B_{final}$, is also encoded at step S826.

For each iteration actually processed (i.e. iteration i, with i less than IT), the side information contains a filtering indicator equal to 1 followed by the encoding of parameters P1 and P2 corresponding to iteration i. Finally, a filtering indicator equal to 0 is inserted in the side information, to indicate that the iteration of the filtering process stops.

In the preferred embodiment, P1 represents the index of the context function selected for block $B_i$ among the subset $C^j$ selected for the initial reference block $B_{ref}$. This is advantageous since the number of bits needed to encode the index of the context function is decreased compared to using its index in the entire set of possible context functions. We may note that the decoder can also apply a step similar to step S803 to determine the prediction mode used for encoding $B_{ref}$ and to deduce a subset of context functions, as explained hereafter with respect to FIG. 9.

For each subset $C^j$, the index of the context function is therefore encoded using a predetermined number of bits, for example using 2 bits if 4 context functions are retained in the subset $C^j$. Next, P2 is encoded using a predetermined number of bits, depending on the number of context values and the number of filters. For example, P2 may be a filter table containing 4 indexes, one for each context value, each index indicating a filter of the set of predetermined filters and being encoded on 3 bits, since there are 9 possible filters.

More sophisticated encodings, such as an entropy encoding of the parameters P1 and P2 may be alternatively applied.

An alternative embodiment for the determination of a subset of context functions will be described below with respect to FIG. 8b.

Figure 8B:
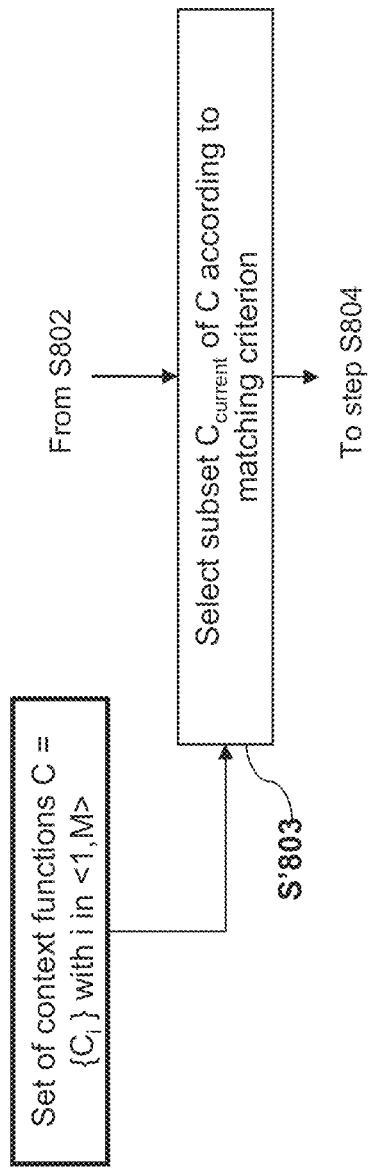

Note that most steps of FIG. 8b are similar to the steps of FIG. 8a, so we use the same reference numbers and omit to describe them again. The main difference is that in this embodiment, a set of context functions, C, is input. Using the example above, C={C0, C1, C2, C3, C4, C5, C6, C7, C8, C9, C10, C11, C12, C13, C14, C15}

Step S'803 is different from step S803 of FIG. 8a.

In step S'803, a subset $C_{current}$ of C is selected according to a predetermined matching criterion to become the set of usable context functions.

To select the subset $C_{current}$, the following method is applied: one after the other, in a predefined order, each context function of set C is applied to the current block $B_i$. Then, the current context function is added to the set of usable context functions $C_{current}$ if the following matching criteria are met:

1. There are at least two pixels where the context function produces different values (this is equivalent to the fact that the block is segmented into two non empty areas).
2. There is no previous context function that produces the same value over more than 90% of the pixels of $B_i$.

This is one example of criterion that ensures that every context function is useful, i.e. it actually performs a segmentation, and that each selected context function provides a new segmentation.

Other criteria can be used, for instance, it is possible to perform a correlation between the segmentation map of one selected context function and the segmentation map of the current context function, and select the current context function only if the correlation is below a certain threshold, thus ensuring that the criterion selects only context function that produce segmentations that are sufficiently different from one another.

Therefore, the matching criteria are meant to select diverse segmentations, ensuring that the in the subset selected does not include two or more segmentation functions that provide similar segmentation on the current block being processed.

Once the subset of context functions $C_{current}$ for the current reference block Bref is selected, all the other following steps are similar to those of the algorithm of FIG. 8a.

In particular, for the encoding of the side information (S826), the number of context functions in the subset $C_{current}$ determines the size (number of bits) necessary to encode an index of the selected optimal context function for a given iteration of the filtering on the reference block.

The embodiment of FIG. 8b is particularly adapted to reference blocks $B_{ref}$ encoded using Inter prediction.

Alternatively, in another embodiment of the invention, the embodiment of FIG. 8a is used for each reference block coded in Intra coding mode and the embodiment of FIG. 8b is used for each reference block coded using Inter prediction.

The embodiments of FIGS. 8a and 8b have been described using context functions as segmentors.

It is possible to use other sets of segmentors, different from the context functions.

For example, we propose an alternative of 9 sets of segmentors based on the Sobel edge detector.

The Sobel edge detector is a well-known filtering technique, which consists in applying two bi-dimensional filters to the image, one filter detecting edges along the vertical direction, and the other one detecting edges along the horizontal direction. The arctangent of the ratio of the output of the two filters provides an estimation of the local orientation of the edge. Any other operator which provides an estimation of the local orientation of the edge may be alternatively applied.

Let us call $\theta(x(i,j))$ the angle provided by the Sobel operator for pixel $x(i,j)$. We build the following orientation segmentation functions:

$D0(\theta) = 0$ if $-\pi/8 < \theta \le \pi/8$
$\quad\quad\quad 1$ if $\pi/8 < \theta \le 2\pi/8$
$\quad\quad\quad 2$ if $-2\pi/8 < \theta \le -\pi/8$
$\quad\quad\quad 3$ otherwise $D1(\theta) = 0$ if $-\pi/8 < \theta + \pi/8 \le \pi/8$
$\quad\quad\quad 1$ if $\pi/8 < \theta + \pi/8 \le 2\pi/8$
$\quad\quad\quad 2$ if $-2\pi/8 < \theta + \pi/8 \le -\pi/8$
$\quad\quad\quad 3$ otherwise $D2(\theta) = 0$ if $-\pi/8 < \theta + 2\pi/8 \le \pi/8$
$\quad\quad\quad 1$ if $\pi/8 < \theta + 2\pi/8 \le 2\pi/8$
$\quad\quad\quad 2$ if $-2\pi/8 < \theta + 2\pi/8 \le -\pi/8$
$\quad\quad\quad 3$ otherwise $D3(\theta) = 0$ if $-\pi/8 < \theta + 3\pi/8 \le \pi/8$
$\quad\quad\quad 1$ if $\pi/8 < \theta + 3\pi/8 \le 2\pi/8$
$\quad\quad\quad 2$ if $-2\pi/8 < \theta + 3\pi/8 \le -\pi/8$
$\quad\quad\quad 3$ otherwise $D4(\theta) = 0$ if $-\pi/8 < \theta + 4\pi/8 \le \pi/8$
$\quad\quad\quad 1$ if $\pi/8 < \theta + 4\pi/8 \le 2\pi/8$
$\quad\quad\quad 2$ if $-2\pi/8 < \theta + 4\pi/8 \le -\pi/8$
$\quad\quad\quad 3$ otherwise $D5(\theta) = 0$ if $-\pi/8 < \theta + 5\pi/8 \le \pi/8$
$\quad\quad\quad 1$ if $\pi/8 < \theta + 5\pi/8 \le 2\pi/8$
$\quad\quad\quad 2$ if $-2\pi/8 < \theta + 5\pi/8 \le -\pi/8$
$\quad\quad\quad 3$ otherwise $D6(\theta) = 0$ if $-\pi/8 < \theta + 6\pi/8 \le \pi/8$
$\quad\quad\quad 1$ if $\pi/8 < \theta + 6\pi/8 \le 2\pi/8$
$\quad\quad\quad 2$ if $-2\pi/8 < \theta + 6\pi/8 \le -\pi/8$
$\quad\quad\quad 3$ otherwise $D7(\theta) = 0$ if $-\pi/8 < \theta + 7\pi/8 \le \pi/8$
$\quad\quad\quad 1$ if $\pi/8 < \theta + 7\pi/8 \le 2\pi/8$
$\quad\quad\quad 2$ if $-2\pi/8 < \theta + 7\pi/8 \le -\pi/8$
$\quad\quad\quad 3$ otherwise Each Di(.) function can be applied on the result of the Sobel detector for a given sample of the block. The result is a segmentation of a given block of samples into 4 different areas.

In the first embodiment described with respect to FIG. 8a, nine subsets of such segmentation functions are built, each adapted to one of the 9 intra prediction modes. Concretely, the following sets are proposed:

$D^0$=(D0, D1, D7)
$D^1$=(D3, D4, D5)
$D^2$=(D0)
$D^3$=(D5, D6, D7)
$D^4$=(D1, D2, D3)
$D^5$=(D2, D3, D4)
$D^6$=(D0, D1, D2)
$D^7$=(D4, D5, D6)
$D^8$=(D0, D6, D7)

Each set contains the orientation segmentation functions that are adapted to segment the type of edges that are expected to be produced in each intra prediction mode.

In the second embodiment described with respect to FIG. 8b, the initial set of segmentors is composed of all segmentation functions: D={D0,D1,D2,D3,D4,D5,D6,D7}. A subset of the set D may be selected at step S'803 as already explained.

Figure 9:
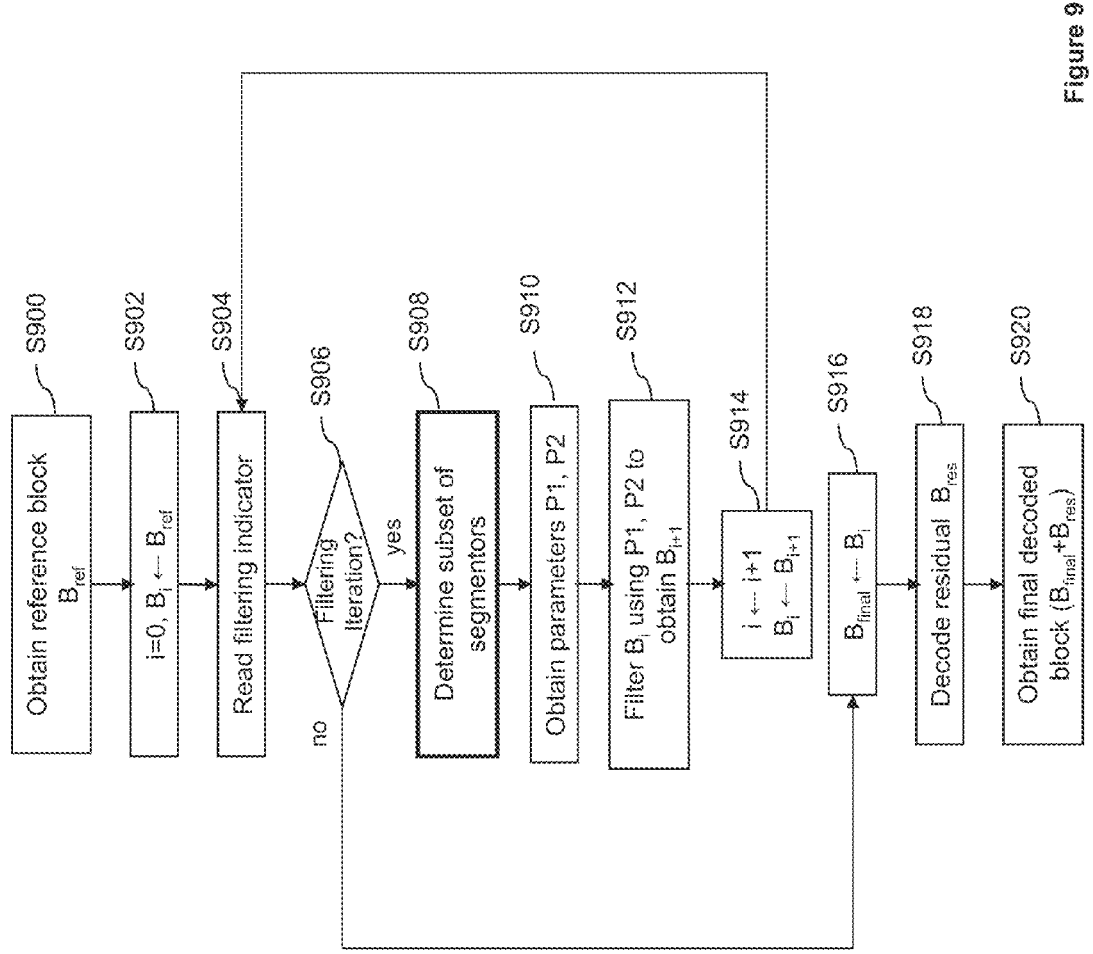
FIG. 9 illustrates the main steps of a method for decoding a predicted block of a digital image.

The flow diagram in FIG. 9 illustrates the main steps of a method for decoding a predicted block of a video signal encoded according to an embodiment of the invention.

All the steps of the algorithm represented in FIG. 9 can be implemented in software and executed by the central processing unit 1111 of the device 1000.

The compressed video signal or bitstream is received at the decoder and comprises in particular the side information generated at the encoder containing items of information representative of the filtering or filterings to be carried out on the reference blocks of the video.

In this embodiment, the side information comprises, for each block encoded by prediction using a reference block, a filtering indicator indicating whether a filtering iteration should be carried out or not, followed by the corresponding filtering parameters if the filtering iteration indicator is positive.

The flowchart of FIG. 9 describes the steps of a decoding algorithm applied for the decoding of a current block to be decoded, which was encoded by prediction to a reference block at the encoder side.

Firstly, at step S900, an initial reference block $B_{ref}$ corresponding to the current block to be decoded is obtained. The initial reference block is obtained by extracting corresponding information from the bitstream, which either indicates an Inter-prediction, so that $B_{ref}$ is a block of another frame of the video, indicated by a motion vector, or an Intra-prediction, so $B_{ref}$ is computed by an Intra prediction mode indicated in the bitstream.

Next at initializing step S902, a variable i is set to 0 and a current input reference block to be processed B, is set to the contents of $B_{ref}$.

In the preferred embodiment, step S902 is followed by step S904 consisting in reading a filtering indicator, indicating whether a filtering iteration should be carried out on the reference block. As explained above, in one embodiment, the side information transmitted for a block comprises a filtering indicator encoded on one bit which indicates whether or not to apply an oriented filtering, so as to indicate the IT filtering iterations to be carried out on a reference block.

In case of positive indication of the filtering indicator (answer 'yes' to step S906), at step S908, a subset of segmentors is determined for the current initial reference block Bref.

Step S908 is similar to step S803 and step S'803, according to which embodiment has been implemented at the encoder. The decoder is informed in advance of which segmentors and which subset selection algorithm has been implemented at the encoder.

If the alternative embodiment is applied, then the decoder first determines whether a reference block has been encoded in Intra coding mode or in Inter prediction coding mode, and chooses the appropriate subset selection algorithm, among the mode of FIG. 8a and the mode of FIG. 8b.

Therefore, the result of step S908 is the same as the result of step S803 or step S'803, since it is assumed here that there is no loss during storage or transmission.

Next, the filtering parameters are obtained from the side information at step S910. Similarly to the encoding, the filtering parameters P1, P2 respectively comprise an indication P1 of the segmentor selected for the current block from the selected subset of segmentors, typically an index of a context function from a subset of context functions when the algorithm of FIG. 8a and/or 8b has been implemented at the encoder and a filter table P2 indicating a filter index for each possible value of the context function.

The index P1 is used to determine the 'optimal' segmentor selected at the encoder, given the subset of segmentors selected at step S908.

Next, the filtering is applied on block B, using parameters P1, P2 obtained at step S912 to output a filtered block $B_{i+1}$.

Similarly to the encoder, the filtering consists in applying the segmentor of index indicated by P1 on the block $B_i$ to obtain a segmentation value for each pixel of the block. Then, for each pixel of block $B_i$, apply the filter $F_j$ among the set of predetermined filters which corresponds to the associated value $V_c$ taken by the segmenting function in the filter table P2.

After obtaining a filtered block $B_{i+1}$, the variable i is increased by one and the current block $B_i$ is set to the content of $B_{i+1}$ at step S914.

The processing then returns to the step S906 of reading the following filtering indicator from the side information.

In case of negative indication by the filtering indicator (answer 'no' to the test S906), meaning that there is no supplementary filtering iteration to carry out, the final reference block $B_{final}$ is set to the content of the current filtered block $B_i$.

Note that for some blocks, the filtering indicator indicates no filtering, therefore the final reference block $B_{final}$ is equal to the initial reference block.

Then the received residual block is decoded at step S918 to obtain a decoded residual $B_{res}$. Note that the decoding of the residual block received for the current block can be carried out earlier and stored in memory. The decoding of the residual block $B_{res}$ consists in applying an entropy decoding, followed by an inverse quantization and an inverse DCT transform.

The final decoded block is obtained at step S920 by adding the decoded residual block $B_{res}$ to the final reference block $B_{final}$.

The invention claimed is:

1. Method for encoding a digital image signal represented by a set of digital samples, at least part of the digital image signal being encoded by reference to a reference digital image signal, the method comprising applying a segmentor to said reference digital image signal to obtain subsets of digital samples and applying a same filter among a set of predetermined filters to each sample of a said subset of digital samples, said segmentor being a context function capturing local characteristics of said reference digital image signal, characterized in that the method comprises the following steps:

selecting a subset of segmentors from a predetermined set of segmentors based upon at least one characteristic obtained from said reference digital image signal, determining one segmentor among said selected subset of segmentors to apply to said reference digital image signal, said one segmentor being determined by iteratively testing each segmentor of said selected subset of segmentors according to a selection criteria, and encoding an item of information representative of said segmentor determined.

2. A method according to claim 1, wherein said item of information is chosen according to said selected subset of segmentors.

3. A method according to claim 2, wherein said item of information comprises an index of said segmentor, said index being encoded taking into account the number of segmentors of said selected subset of segmentors.

4. A method according to claim 1, wherein said reference digital image signal is a block of samples of a digital image, and said characteristic is representative of a predictive encoding mode applied to encode said block of samples, and wherein in said selecting step, a predetermined subset of segmentors is selected based upon said characteristic.

5. A method according to claim 4, wherein said predictive encoding mode an Intra-prediction mode of H.264 encoding format.

6. A method according to claim 1, wherein said selecting step comprises, for each segmentor of said predetermined set of segmentors, taken in a predetermined order:

applying said segmentor on said reference digital image signal, each digital sample of the reference digital image signal being associated with a segmentation value representative of a segmented subset of digital samples and adding said segmentor to said subset of segmentors if said segmentation values obtained satisfy at least one predetermined matching criterion.

7. A method according to claim 6, wherein the or one said predetermined matching criterion comprises checking whether at least two different segmentation values have been obtained by applying said segmentor.

8. A method according to claim 6, wherein the or one said predetermined matching criterion comprises checking whether there is no previously applied segmentor which provides the same segmentation values on a predetermined quantity of digital samples of said reference digital image signal.

9. A method according to claim 1, wherein said context function is a function that, when applied to a given digital sample of a set of digital samples, takes into account a predetermined number of other digital samples of said set of digital samples and outputs a context value.

10. A method according to claim 1, wherein a segmentor is obtained by:

applying an edge detector operator on said reference digital image signal providing a value representative of an estimation of a local edge orientation associated with each digital sample of said reference digital image signal, and applying an orientation segmentation function which takes into account said value representative of an estimation of a local edge orientation and outputs a value among a predetermined set of possible values.

11. Method for decoding a bitstream comprising an encoded digital image signal represented by a set of digital samples, at least part of the digital image signal being encoded by reference to a reference digital image signal, the method comprising applying a segmentor to said reference digital image signal to obtain subsets of digital samples and applying a same filter among a set of predetermined filters to each sample of a said subset of digital samples, said segmentor being a context function capturing local characteristics of said reference digital image signal, characterized in that the method comprises the following steps:

selecting a subset of segmentors of a predetermined set of segmentors based upon at least one characteristic obtained from said reference digital image signal, and obtaining from said bitstream an item of information representative of one segmentor among said selected subset of segmentors to apply to said reference digital image signal.

12. A method according to claim 11, wherein said item of information representative of a segmentor comprises an index of said segmentor, said index being encoded taking into account the number of segmentors of said selected subset of segmentors.

13. Device for encoding a digital image signal represented by a set of digital samples, at least part of the digital image signal being encoded by reference to a reference digital image signal, the device comprising means for applying a segmentor to said reference digital image signal to obtain subsets of digital samples and means for applying a same filter among a set of predetermined filters to each sample of a said subset of digital samples, said segmentor being a context function capturing local characteristics of said reference digital image signal, the device being characterized in that the method comprises:

means for selecting a subset of segmentors from a predetermined set of segmentors based upon at least one characteristic obtained from said reference digital image signal, and signal, means for determining one segmentor among said subset of selected segmentors to apply to said reference digital image signal, said one segmentor being determined by iteratively testing each segmentor of said selected subset of segmentors according to a selection criteria, and means for encoding an item of information representative of said segmentor determined.

14. Device for decoding a bitstream comprising an encoded digital image signal represented by a set of digital samples, at least part of the digital image signal being encoded by reference to a reference digital image signal, the device comprising means for applying a segmentor to said reference digital image signal to obtain subsets of digital samples and means for applying a same filter among a set of predetermined filters to each sample of a said subset of digital samples, said segmentor being a context function capturing local characteristics of said reference digital image signal, the decoding device being characterized in that the decoding device comprises:

means for selecting a subset of segmentors of a predetermined set of segmentors based upon at least one characteristic obtained from said reference digital image signal, and means for obtaining from said bitstream an item of information representative of one segmentor among said selected subset of segmentors to apply to said reference digital image signal.

15. A non-transitory computer-readable storage medium storing a program which, when run on a computer, causes the computer to carry out a method for encoding a digital image signal represented by a set of digital samples, at least part of the digital image signal being encoded by reference to a reference digital image signal, the method comprising applying a segmentor to said reference digital image signal to obtain subsets of digital samples and applying a same filter among a set of predetermined filters to each sample of a said subset of digital samples, said segmentor being a context function capturing local characteristics of said reference digital image signal, characterized in that the method comprises the following steps:

selecting a subset of segmentors from a predetermined set of segmentors based upon at least one characteristic obtained from said reference digital image signal, determining one segmentor among said selected subset of segmentors to apply to said reference digital image signal, said one segmentor being determined by iteratively testing each segmentor of said selected subset of segmentors according to a selection criteria, and encoding an item of information representative of said segmentor determined.

16. A bitstream representative of an encoded digital image signal represented by a set of digital samples, at least part of the digital image signal being encoded by reference to a reference digital image signal, said bitstream comprising an item of information representative of a segmentor determined among a selected subset of segmentors, said segmentor being a context function capturing local characteristics of said reference digital image signal, wherein a said segmentor is applied to said reference digital image signal to obtain subsets of digital samples and a same filter among a set of predetermined filters is applied to each sample of a said subset of digital samples.

17. A non-transitory computer-readable storage medium storing a program which, when run on a computer, causes the computer to carry out a method for decoding a bitstream comprising an encoded digital image signal represented by a set of digital samples, at least part of the digital image signal being encoded by reference to a reference digital image signal, the method comprising applying a segmentor to said reference digital image signal to obtain subsets of digital samples and applying a same filter among a set of predetermined filters to each sample of a said subset of digital samples, said segmentor being a context function capturing local characteristics of said reference digital image signal, characterized in that the method comprises the following steps:

selecting a subset of segmentors of a predetermined set of segmentors based upon at least one characteristic obtained from said reference digital image signal, and obtaining from said bitstream an item of information representative of one segmentor among said selected subset of segmentors to apply to said reference digital image signal.

\* \* \* \* \*